(12) United States Patent
Waida et al.

(10) Patent No.: US 7,711,642 B2
(45) Date of Patent: May 4, 2010

(54) PAYMENT FORM DISCRIMINATION METHOD AND APPARATUS

(75) Inventors: Toshiyuki Waida, Kawasaki (JP); Shinichi Eguchi, Kawasaki (JP); Kouichi Kanamoto, Kawasaki (JP); Maki Yabuki, Kawasaki (JP); Koichi Chiba, Kawasaki (JP); Katsutoshi Kobara, Kawasaki (JP); Kazunori Yamamoto, Kawasaki (JP); Yutaka Katsumata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1220 days.

(21) Appl. No.: 09/767,842

(22) Filed: Jan. 24, 2001

(65) Prior Publication Data

US 2003/0167228 A1 Sep. 4, 2003

(30) Foreign Application Priority Data

May 31, 2000 (JP) ............................. 2000-162605

(51) Int. Cl.
*G06Q 40/00* (2006.01)
(52) U.S. Cl. ........................ 705/40; 382/137; 382/138; 382/139; 382/140; 382/306
(58) Field of Classification Search .................. 705/35, 705/37, 39–40; 382/137–140, 317–321, 382/306
See application file for complete search history.

(56) References Cited

U.S. PATENT DOCUMENTS

| | | | | |
|---|---|---|---|---|
| 5,265,171 | A * | 11/1993 | Sangu | 382/177 |
| 5,897,625 | A * | 4/1999 | Gustin et al. | 705/43 |
| 6,097,834 | A * | 8/2000 | Krouse et al. | 382/137 |
| 6,351,735 | B1 * | 2/2002 | Deaton et al. | 705/14 |
| 6,363,362 | B1 * | 3/2002 | Burfield et al. | 705/40 |
| 6,385,595 | B1 * | 5/2002 | Kolling et al. | 705/40 |
| 6,885,769 | B2 * | 4/2005 | Morita et al. | 382/181 |
| 2002/0073060 | A1 * | 6/2002 | Geisel et al. | 707/1 |

FOREIGN PATENT DOCUMENTS

| | | |
|---|---|---|
| EP | 0354703 B1 | 2/1990 |
| JP | 59-47641 | 3/1984 |
| JP | 2-72752 | 3/1990 |
| JP | 4-316176 | 11/1992 |

(Continued)

OTHER PUBLICATIONS

Lunt, Penny, Spencer, Hillary, Banking & Tools Solutions, Imaging & Document Solutions, San Francisco: Sep. 1999. vol. 8, Iss. 9; p. 57, 5 pgs.*

(Continued)

*Primary Examiner*—Stefanos Karmis

(57) ABSTRACT

A method for identifying payment forms accurately identifies types of forms without adding special form identification data. A payment form discrimination method for discriminating payment forms which state a payee account number and a payment amount includes a step of acquiring an image of the form, a step of making a search for the payee account number in the image in accordance with an account number searching rule, and a step of discriminating the type of form based on the searched payee account number. Types of forms can be identified accurately and fast without adding special form identification data, because the form identification is performed using easily searchable account numbers.

9 Claims, 10 Drawing Sheets

FOREIGN PATENT DOCUMENTS

| | | |
|---|---|---|
| JP | 9-204492 | 8/1997 |
| JP | 11-88634 | 3/1999 |
| JP | 11-224305 | 11/1999 |
| JP | 11-331411 | 11/1999 |

OTHER PUBLICATIONS

Totty, Patrick, Check Image Processors Are Getting Smarter, Credit Union Magazine, Madison, Oct. 1998. vol. 64, Iss. 10; p. 49, 3 pgs.*

* cited by examiner

| CC県 DD市 | 個人市民税 個人県民税 納入書 ㊙ | CC県 DD市 | 個人市民税 個人県民税 納入済通知書 ㊙ |
|---|---|---|---|
| 市区町村コード 4 0 1 0 0 5 | ㊗ | 市区町村コード 4 0 1 0 0 5 | 様式コード 3 7 票種コード 1 1 2 ㊗ |

43 — left panel; 44 — right panel; 4

| 口座番号 | 加入者名 | 口座番号 | 加入者名 |
|---|---|---|---|
| 01770-1-900237 | DD市役所 | 01770-1-960237 | DD市役所 |
| | 指定番号 | | 指定番号 |

平成 12 年 1月分　　　　　　　平成 12 年 1月分

| 納入金額 | 給与分 | 4 9 0 0 0 | 納入金額 | 給与分 | 4 9 0 0 0 |
|---|---|---|---|---|---|
| | 退職所得分 | | | 退職所得分 | |
| | 延滞金 | | | 延滞金 | |
| | 合計額 | 4 9 0 0 0 | | 合計額 | 4 9 0 0 0 |

| 納期限 | 平成12年 2月10日 | 納期限 | 平成12年 2月10日 |

50, 51, 56

| 日計 | 領収日付印 | 取りまとめ局 DD貯金事務センター | 領収日付印 |
| | 円 | (受付店-XX銀行/○○銀行) | |
| | | (市町村保管) | |

FIG. 9

| Recognition Result | 5-digit Number | | | | | 1-digit Number | 6-digit Number | | | | | The Reject Number |
|---|---|---|---|---|---|---|---|---|---|---|---|---|
| | 1digit | 2digit | 3digit | ... | 5digit | 1digit | 1digit | 2digit | 3digit | ... | 6digit | |
| ① | 1 | 2 | 3 | | ? | 1 | 4 | 1 | ? | | 6 | 2 |
| ② | 1 | 2 | ? | | 5 | 1 | 1 | 2 | 3 | | 6 | 1 |
| ③ | 1 | 7 | 3 | | ? | 1 | ? | 7 | 3 | | ? | 3 |
| Merge Result | 1 | 2 | 3 | | 5 | 1 | 1 | 2 | 3 | | 6 | |

?: means reject

Neglect Reject

Use Host Often Recognition Result

Use Fewer Rejected Recognition Data

PAYMENT FORM DISCRIMINATION METHOD AND APPARATUS

BACKGROUND OF THE INVENTION

1. Field of the Invention

The present invention relates to a payment form discrimination method and apparatus for discriminating payment forms for paying taxes or public utilities fees at a financial institution or the like, and in particular to a payment form discrimination method and apparatus that searches for a character string by which forms can be discriminated and discriminates the forms by the search results.

2. Description of the Related Art

The payment of fees, such as taxes or public utilities fees, can be carried out at a place that is convenient for the person making the payment, like a financial institution, a post office, a convenience store, etc. For such a payment of fees, a payment form stating the payment amount is sent to the person who has to make the payment. The payer then takes the payment form to a financial institution or the like, where the payer can pay the fees. There is a strong demand for the automation of such a fee payment process.

Usually, methods for automatically recognizing characters on the payment form are used for automatic payment processing. For this automatic recognition, there is no need to recognize all characters on the payment form. For example, it is sufficient to recognize the payee, the payment amount and the payment time limit on a tax payment form, and there is no necessity to recognize captions or the like. In order to recognize the characters of the relevant portions among the multitude of characters on such a payment form, it is advantageous to register formats of the form in advance, cut out the registered regions from the read in image of the form, and perform character recognition with the registered character types.

Moreover, since there are several types of forms with different formats that can be processed automatically, it is necessary to identify the format type, access the identified format of the form, and carry out a character recognition depending on the form type. The following techniques have been proposed as automatic identification methods of the form type:

(1) Subjecting a group of characters indicating the form type, such as a title on the form (for example, payment notification slip) to automatic recognition, so as to identify the form type.

(2) Extracting rules from the form and identifying the rule type by the format of the rules.

(3) Attaching form discrimination information, such as a barcode, on the form to be recognized, and reading this information to identify the form.

However, these techniques pose the following problems:

(1) The method of recognizing a form title poses the problems that the recognition process takes a long time since the title is in Chinese (Kanji) characters, and there is the possibility of confusion with forms of similar titles. For example, in payment forms for municipal taxes, similar forms may be used for city A and for city B, so that it is not possible to recognize the forms by the title "Local Taxes".

(2) The recognition with rules takes a long time to process, and there is the problem that when the rule formats are similar, the form may easily be identified incorrectly.

(3) With the method of attaching form discrimination information, the forms can be discriminated reliably, but there is the problem that only those forms can be identified to which discrimination information has been attached. That is to say, it is not possible to identify those forms currently in circulation to which such discrimination information has not been attached.

SUMMARY OF THE INVENTION

Consequently, it is an object of the present invention to provide a payment form discrimination method and apparatus, with which payment forms can be accurately identified even when no discrimination information is attached to them.

It is another object of the present invention to provide a payment form discrimination method and apparatus, with which payment forms can be identified quickly.

It is yet another object of the present invention to provide a payment form discrimination method and apparatus, with which payment forms can be identified quickly using one portion of the recognition data on the payment form.

In order to attain these objects, a payment form discrimination method of the present invention for discriminating payment forms which state at least a payee account number and a payment amount, includes a step of acquiring an image of the form; a step of searching the payee account number in the image in accordance with an account number searching rule; and a step of discriminating the type of form based on the searched payee account number.

A payment form recognition apparatus of the present invention includes an image reader for acquiring an image of the form; and a processing unit, which makes a search for the payee account number in the image in accordance with an account number searching rule, and discriminates the type of form based on the searched payee account number; wherein the processing unit recognizes respective areas of the image by corresponding recognition categories, depending on the type of form that has been discriminated.

The present invention takes advantage of the fact that the payment form contains the payee account number, and that the form type is specified by this account number, so that the form is identified by recognizing the payee account number from the form image. Moreover, the account number is a character string of numerals and symbols, so that the account number can be identified on the form image with high precision by simple search rules (knowledge information). Therefore, the form can be identified accurately and fast. Furthermore, the payee account number is a portion of the input data of the payee form, so that form identification and data input can be performed simultaneously.

When the searching step in the payment form discrimination method of the present invention includes a step of recognizing an account number with the searching rule; and a step of determining whether this recognized account number is a registered account number. Therefore, the account number can be recognized with a simple searching rule, while incorrect recognition results can be prevented by referencing the registered data.

When the searching step in the payment form discrimination method of the present invention is a step of making a search for the payee account number in accordance with a searching rule that is based on recognition categories and regularities regarding a character string, then the account number can be searched with a simple rule, and the process speed can be increased.

When the searching step in the payment form discrimination method of the present invention includes a step of recognizing a plurality of account numbers on the payment form, and a step of merging a plurality of result which have been recognized to determine the payee account number, then incorrect recognition results can be prevented.

BRIEF DESCRIPTION OF THE DRAWINGS

FIG. 3 is a diagram illustrating a specific example of a tax payment form to be recognized by the apparatus in FIG. 1.

FIG. 4 is a diagram illustrating a specific example of another tax payment form to be recognized by the apparatus in FIG. 1.

FIG. 9 is a diagram illustrating the operation of the form recognition process in FIG. 7.

DESCRIPTION OF THE PREFERRED EMBODIMENTS

The following is an explanation of the present invention, divided into a form recognition apparatus, a form discrimination process, and other embodiments of the present invention.

Form Recognition Apparatus

Figure 1:
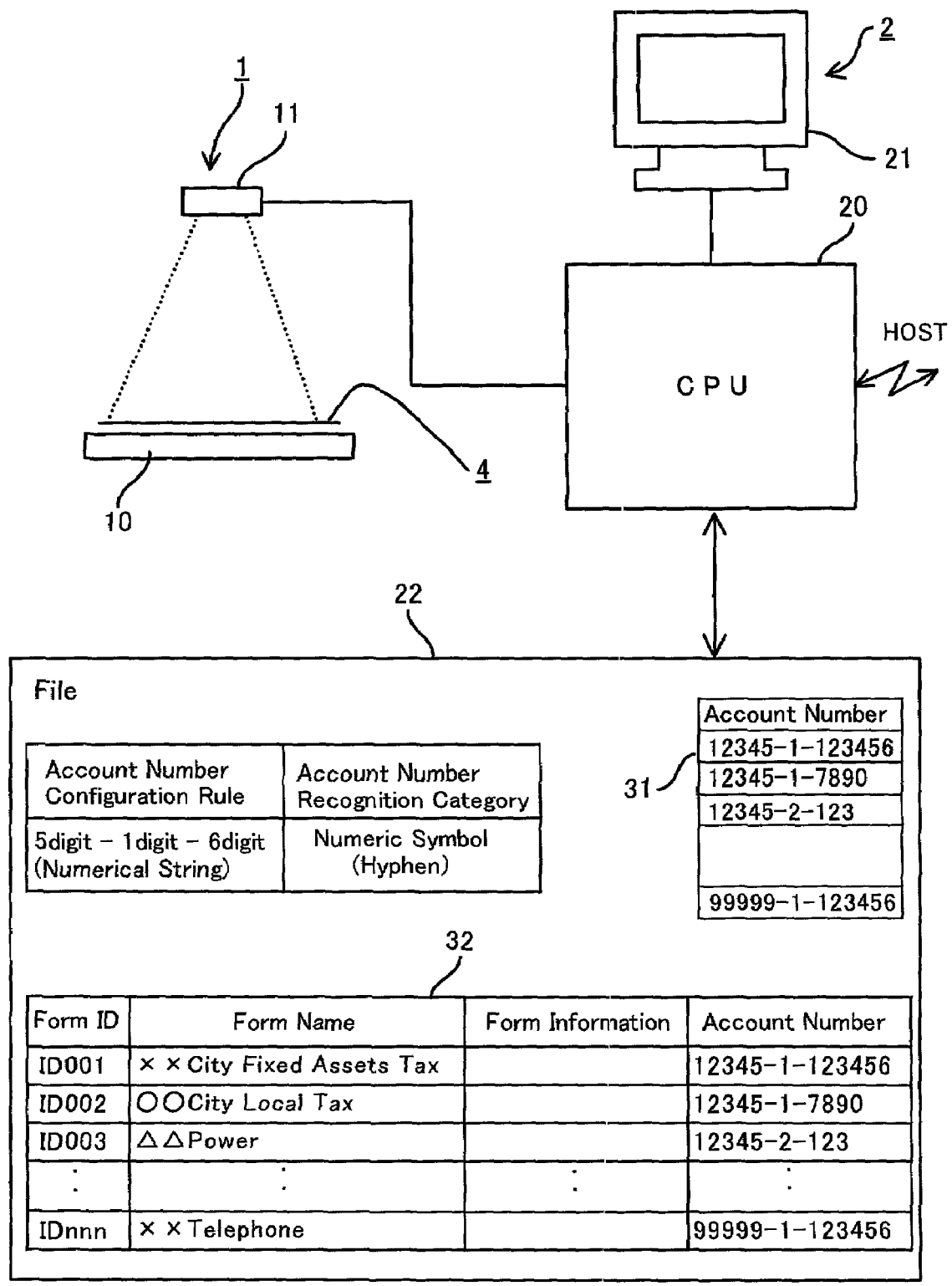
FIG. 1 is a block diagram of a form recognition apparatus in an embodiment of the present invention.
Figure 2:
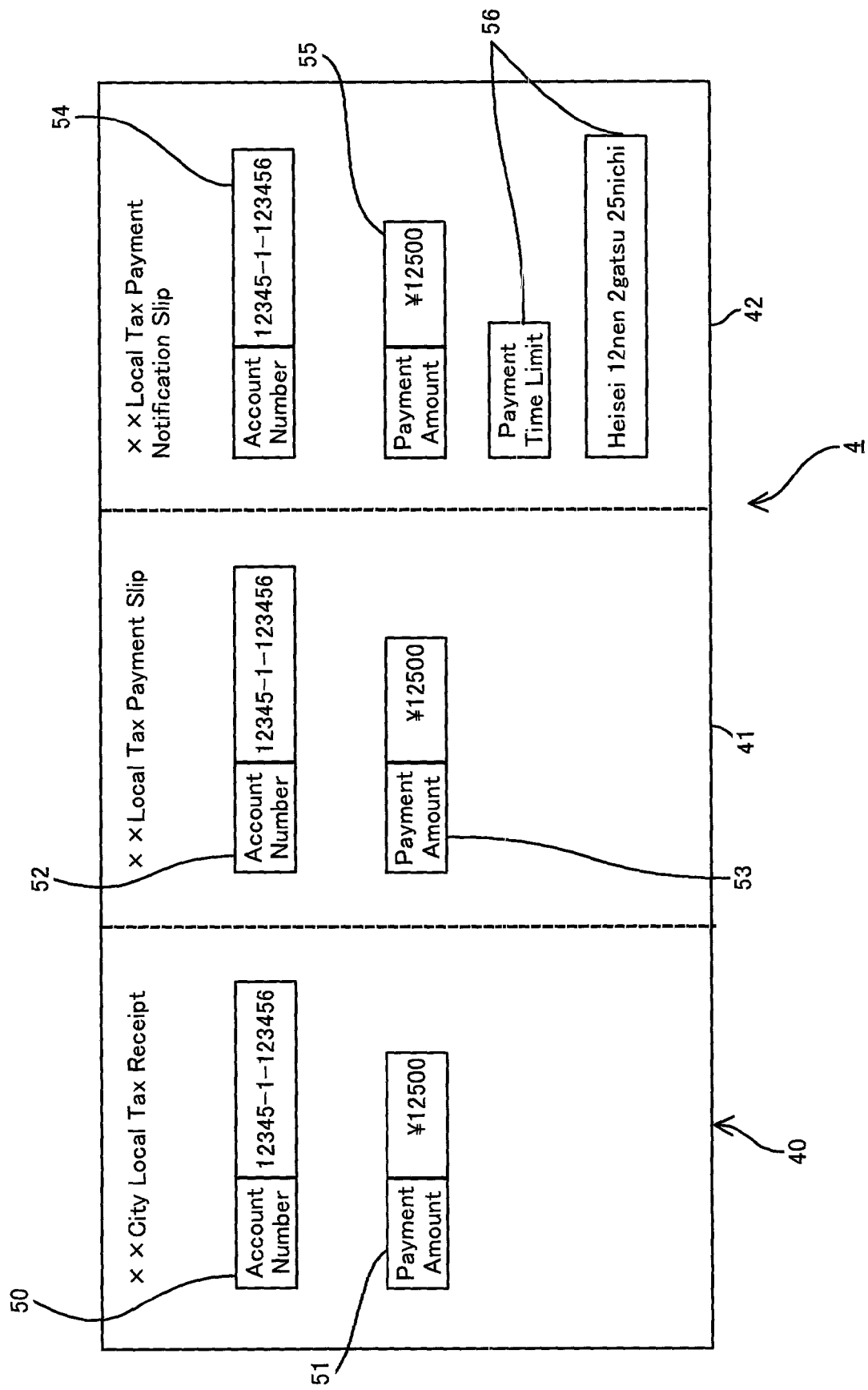
FIG. 2 is a diagram illustrating a payment form to be recognized by the apparatus in FIG. 1.
Figure 3:
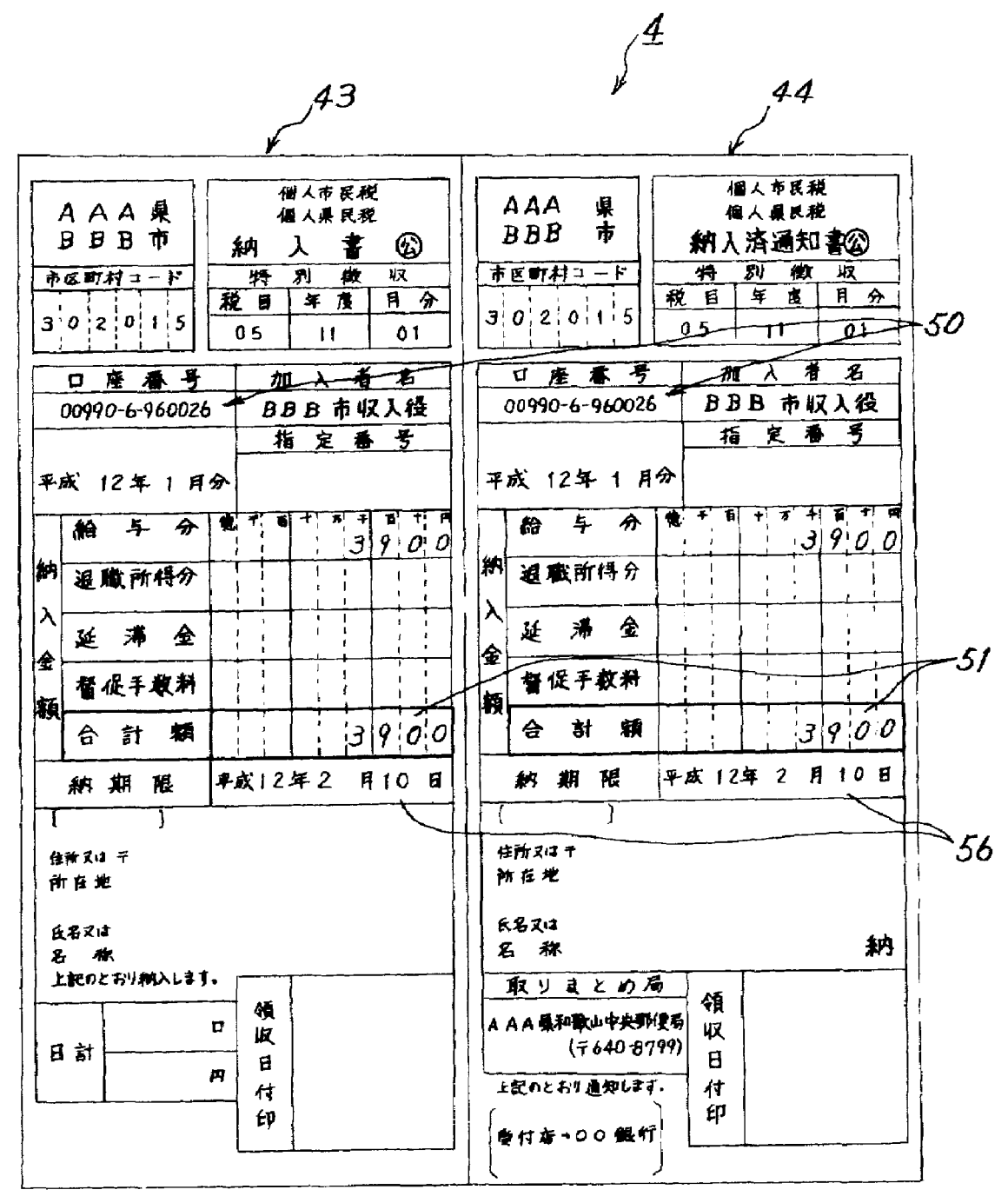
Figure 5:
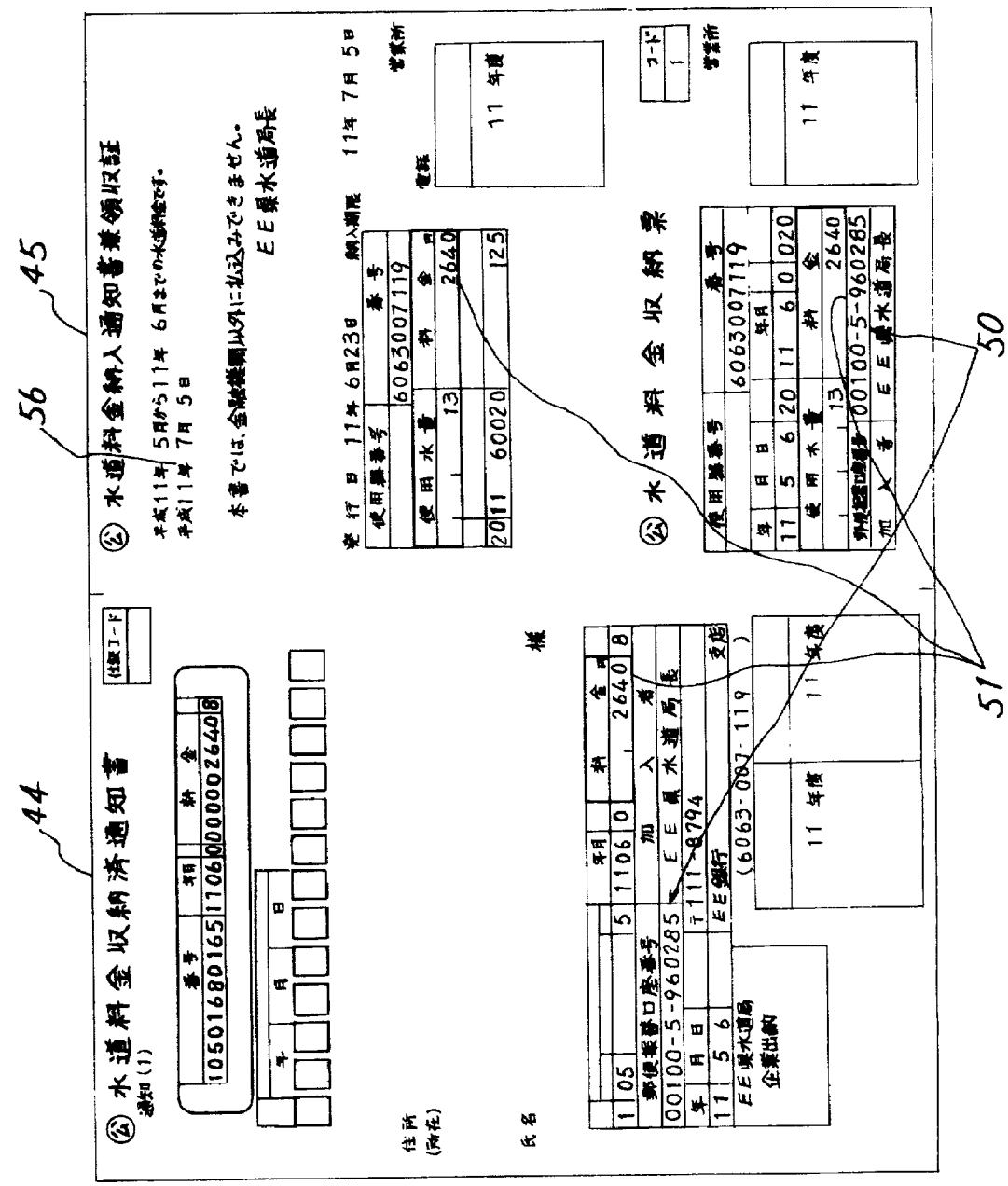
FIG. 5 is a diagram illustrating a public utilities fees payment form to be recognized by the apparatus in FIG. 1.

FIG. 1 is a block diagram of a form recognition apparatus, FIG. 2 is a diagram illustrating a payment form to be recognized, and FIGS. 3 to 5 are diagrams illustrating specific examples of a payment form.

As shown in FIG. 1, an image scanner 1 includes a scan bed 10 on which the form 4 to be scanned is placed, and an optical scanner 11, which reads in an image of the form placed on the scan bed 10 and sends the image data to a processing device 2. This image scanner 1 is of the non-contact type, and the scanner 11 is made of color CCD (Charge Coupled Device).

The processing device 2 is made of a desktop personal computer, and includes a data processing unit (CPU) 20, a display device 21, and files 22. The data processing unit 20 is made of a CPU, a memory, etc., and carries out a form recognition process. Before explaining the configuration of the files 22, the payment form 4 is explained, with reference to FIGS. 2 to 5.

FIG. 2 is a diagram of the payment form 4, and shows a local tax payment form described in Chinese character. The city to which the taxpayer belongs sends this payment form 4 to the taxpayer, and the taxpayer presents this payment form 4 and cash at a tax payment counter of a financial institution or the like. The payment form 4 consists of a local tax receipt 40, a local tax payment slip 41, and a local tax payment notification slip 42. The receipt 40 is handed to the taxpayer at the tax payment counter. The payment slip 41 is kept by the financial institution or the post office as the payment counter. The payment notification slip 42 is kept by the city collecting the tax.

A payee account number 50 and a payment amount 51 are described in the receipt 40. The payee account number 50 is the city's account number for postal transfer, and the payment amount 51 is the amount of taxes paid. Similarly, a payee account number 52 and 54 and a payment amount 53 and 55 are described in the payment slip 41 and the notification slip 42. A payment time limit 56 is further described in the notification slip 42. These are the elements to be recognized. As will be explained below, the account number is made up of numbers and hyphens, namely a 5-digit number, followed by a hyphen, another 1-digit number, a hyphen and a six-digit number. That is to say, it consists of fixed recognition categories and regular character strings.

FIGS. 3 and 4 show specific examples of a payment 4 for local tax described in Kanji characters. FIG. 3 shows a payment form for local (municipal and prefecture) tax of AAA prefecture and BBB city. FIG. 4 shows a payment form for local (municipal and prefecture) tax of CC prefecture and DD city. Both consist of a payment slip 43 and a payment notification slip 44, into which the payee account number 50, the payment amount 51 and the payment time limit 56 are described. These are the elements to be recognized, whereas all other entries are reference information. Also in this form 4, the account number is made up of numbers and hyphens, namely a 5-digit number, followed by a hyphen, another 1-digit number, a hyphen and a six-digit number. That is to say, it consists of fixed recognition categories and regular character strings.

FIG. 5 shows a specific example for a payment form 4 for the collection of water services fees by FF prefecture, which consists of a notification slip and receipt 45 and a payment notification slip 44, into which the payee account number 50, the payment amount 51 and the payment time limit 56 are entered. These are the elements to be recognized, whereas all other entries are reference information. Also in this form 4, the account number is made up of numbers and hyphens, namely a 5-digit number, followed by a hyphen, another 1-digit number, a hyphen and a six-digit number. That is to say, it consists of fixed recognition categories and regular character strings.

In these forms, the elements to be recognized are the same, but their position is different. In accordance with the present invention, as the payee account number 50 is specified to the payee issuing the payment form 4, and in order to discriminate between these forms, the payee account number 50 is recognized to identify the form.

Returning to FIG. 1, the file 22 has a search rule table 30, an account master table 31, and a form data table 32. The search rule table 30 stores the rules for searching the account numbers, and stores the rule by which the account numbers are configured and the account number identification categories. In the case of the above-described forms, the rule by which the account numbers are configured is that it is a numerical string within 5 digits-(hyphen)-1 digit-(hyphen)-6 digits, and the account number identification categories are numerals and symbols (hyphens). Based on this search rule, the CPU 20 searches the image of the form for an account number, which is then recognized. Based on this search rule, the account number can be found and recognized on the image, regardless where it is located on the form image.

The account master file 31 is a master file of actual account numbers and is used to check whether a recognized account number actually exists. The form data table 32 is a table in which the formats of the various forms are stored, such as form IDs, form names, form data, account numbers, etc. The form data include, for example, the position of the characters to be recognized in the image and the recognition categories.

In an example of the present invention, account numbers are added into a conventional form data table 32, in addition to the search rule table 30 and the account master table 31. Thus, it is possible to specify the forms with the recognized account number, and character recognition using the form data in the table 32 becomes possible.

This form recognition apparatus can be installed at designated payment counters at financial institutions, post offices, convenience stores, or the like. The form recognition apparatus is connected to a host computer (not shown in the drawings).

Form Identification Process

Figure 6:
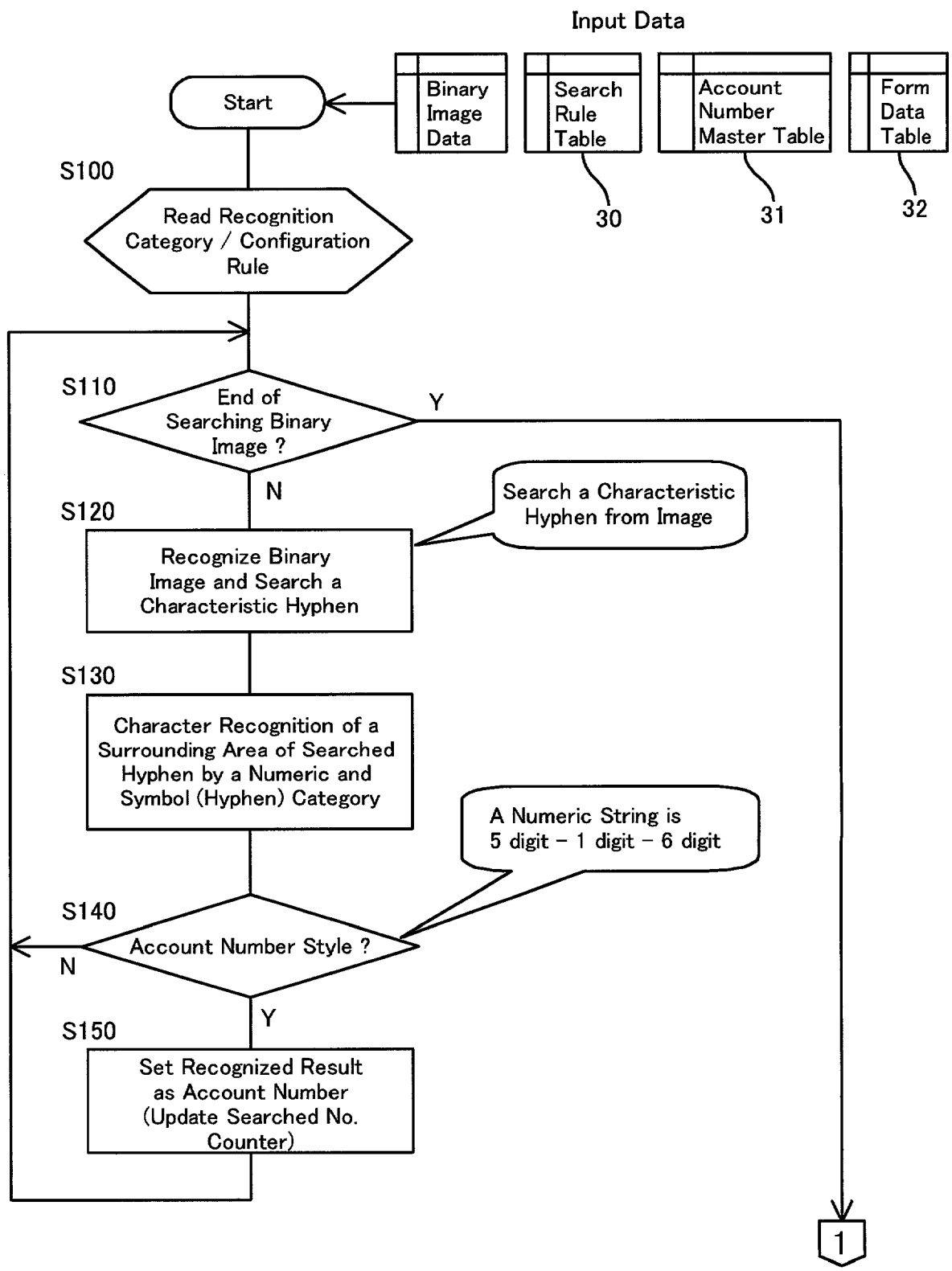
FIG. 6 is a first part of a flow chart of a form recognition process in an embodiment of the present invention.
Figure 7:
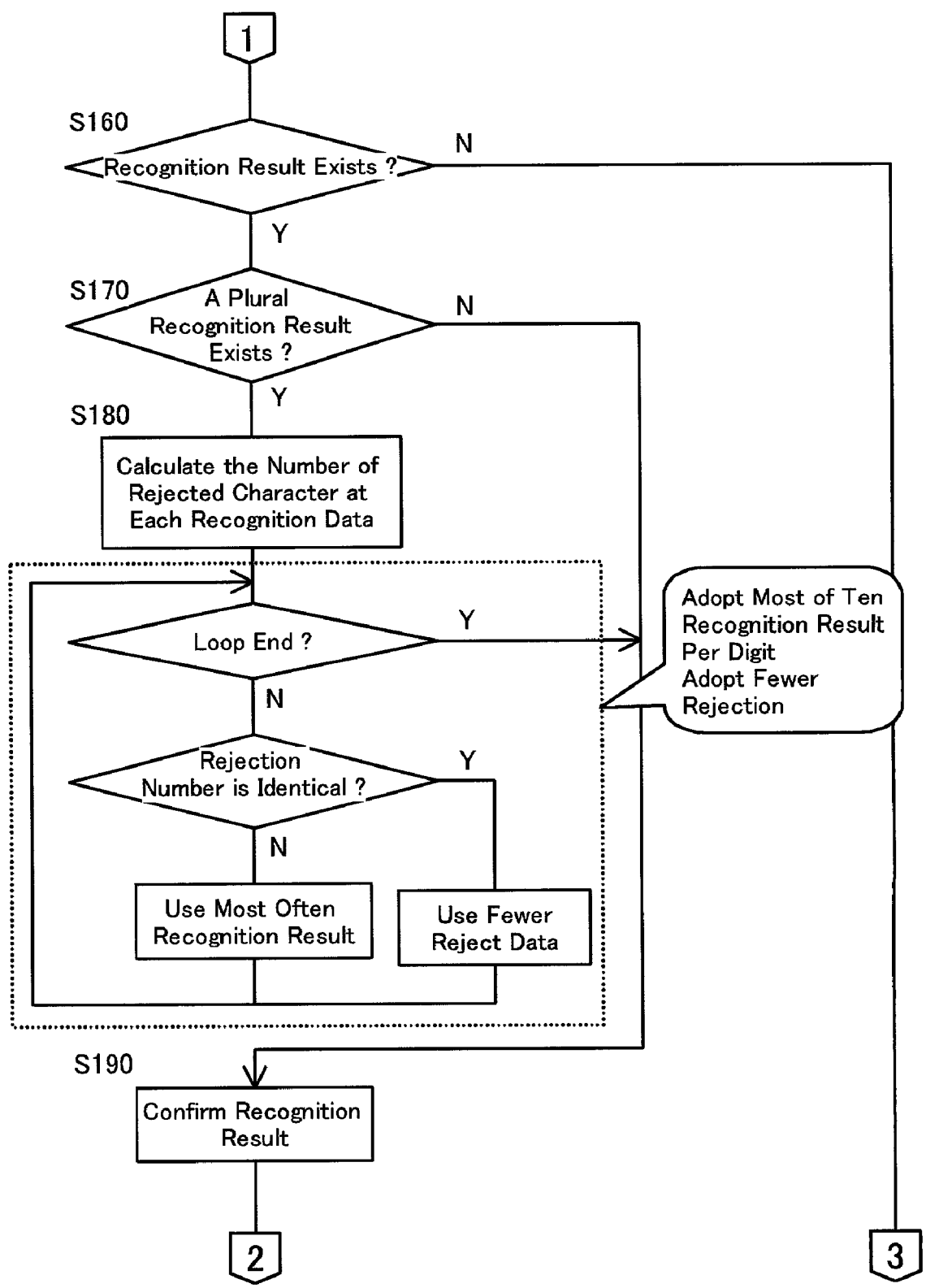
FIG. 7 is a second part of a flow chart of a form recognition process in an embodiment of the present invention.
Figure 8:
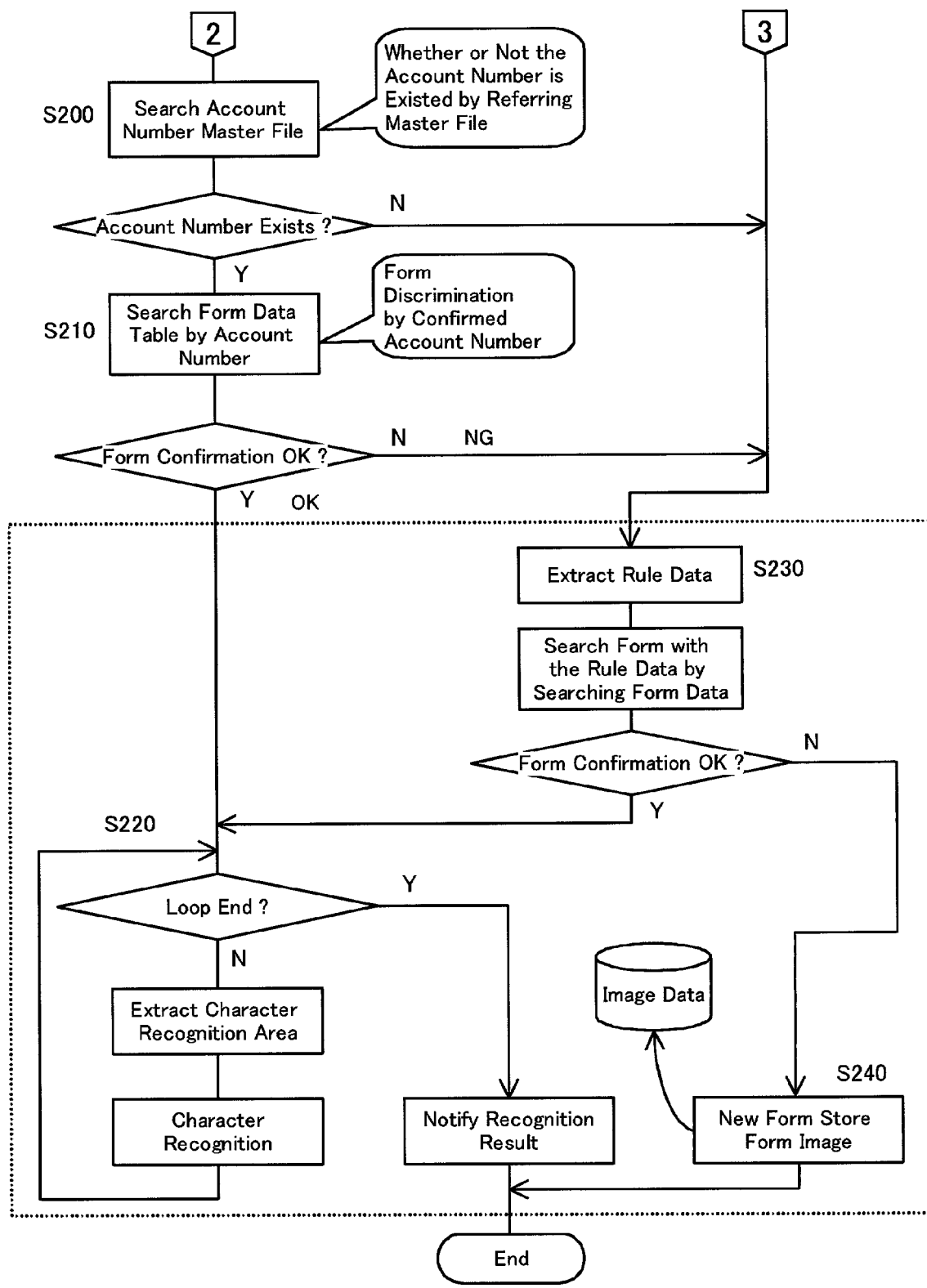
FIG. 8 is a third part of a flow chart of a form recognition process in an embodiment of the present invention.

FIGS. 6 to 8 are flow charts of the form recognition process in an embodiment of the present invention, and FIG. 9 is a diagram for illustration of this operation. FIGS. 6 to 8 show the form recognition process carried out by the CPU 20 of FIG. 1.

S100: After the CPU 20 has acquired a binary image from the image reader 1 and stored it into its internal memory, it retrieves the recognition categories and the configuration rules from the search rule table 30 and starts to search the binary image.

S110: The CPU 20 determines whether the search of the binary image of the image reader 1 has been finished. If the search has been finished, the process advances to Step S160 in FIG. 7.

S120: Recognizing a specified recognition category (in this case, a hyphen) in the image data of the binary image, the CPU 20 searches for characteristic hyphens, as defined by the configuration rules. According to the configuration rules, characteristic hyphens are two hyphens arranged in series.

S130: When characteristic hyphens have been recognized, the surroundings of the hyphens are subjected to character recognition in the categories numerals and symbols (hyphens), which are the specified recognition categories.

S140: Then, it is decided whether the character string that has been subjected to character recognition is a numerical string within the configuration rules of the account number, namely 5 digits-1 digit-6 digits. When the recognized character string does not match the configuration rules, the process returns to Step S110.

S150: When the recognized numerical string does match the configuration rules, then this numerical string is taken as the account number, thereby obtaining the recognition result. Moreover, a number extraction counter is updated. Then, the process returns to Step S110.

S160: After finishing the search of the form image in FIG. 6, the process advances to FIG. 7, and the CPU 20 decides whether a recognition result has been obtained. When no recognition result has been obtained, then the image search was unsuccessful, and the process advances to Step S230 in FIG. 8.

S170: When a recognition result has been obtained, then it is determined with the number extraction counter, whether there is more than one recognition result. If there is not more than one recognition result, that is, if there is o only one recognition result, then the process advances to Step S190.

S180: When more than one recognition result has been obtained, then a process of merging the recognition results is performed. That is to say, the number of rejected characters in the recognition results is calculated. The number of rejections in recognitions results ①, ② and ③ for 5 digits-1 digit-6 digits is calculated as shown in FIG. 9. Here, "rejected character" means that it has been determined that a character is a number, but it could not be determined which number. Then the character strings of the rejection results are merged. As shown in FIG. 9, when the number of rejections is not identical, then the merged result of a digit is taken to be the numerical character that has been recognized most often for that digit. When the number of rejections is identical, then the merged result of a digit is taken to be the numerical character of the recognition data with the fewer rejections. This is repeated for the each character in the character string, and the procedure advances to Step S190.

S190: If there is only one recognition result in Step S170, then this recognition result is confirmed as the recognition result, and if there is more than one recognition result and a merge process was performed in Step S180, then the merge result is confirmed as the recognition result.

S200: The process advances to FIG. 8, and it is determined by referencing the master file 31 whether the confirmed recognition result (account number) actually exists. If the account number does not actually exist, then the recognition has failed, and the process advances to Step S230.

S210: If the account number actually exists, then the form data table 32 is referenced with this account number, and it is determined whether a corresponding form exists. If there is no corresponding form, then the form cannot be confirmed, and the procedure advances to Step S230.

S220: When the corresponding form has been confirmed, then, as conventionally, the character recognition data (positions of elements to be recognized and recognition categories) of the corresponding recognition portions are retrieved from the form data, and the data at the relevant positions of the form image data are subjected to a character recognition with these recognition categories. This is repeated for all characters to be recognized as specified by the form data, and the recognition results are sent to the host. Then, the form recognition process is finished.

S230: If the account number cannot be confirmed, then the form identification is carried out with another method. Here, an attempt is made to identify the forms by conventional rule extraction. That is to say, rule data are extracted from the binary image, and the form data in the form data table 32 are searched to find a form with matching rule data. When a form with matching rule data has been found, then the process advances to Step S220, and character recognition is performed.

S240: If no form with matching rule data can be found, then it is concluded that the form is a new form, the image is stored for form registration at a later stage (explained below with reference to FIG. 10), and the process is finished.

Thus, the payee account number described into the payment form is searched to identify the form, so that the account number can be identified from the form image with high precision by simple search rules (knowledge information), because the account number is a character string of numerals and symbols. Therefore, the form can be identified accurately and fast. Furthermore, since the payee account number is a portion of the data input into the payment form, the form identification and the data input can be carried out simultaneously.

The hyphens are detected on the form image, and their surroundings are subjected to character recognition, so that the account number can be recognized with high speed and precision, even when the position of the account number is not specified. Furthermore, due to the merging process, incorrect recognition results can be discarded. Similarly, incorrect recognition results can be completely prevented by reference to registered account numbers in a master file.

Figure 10:
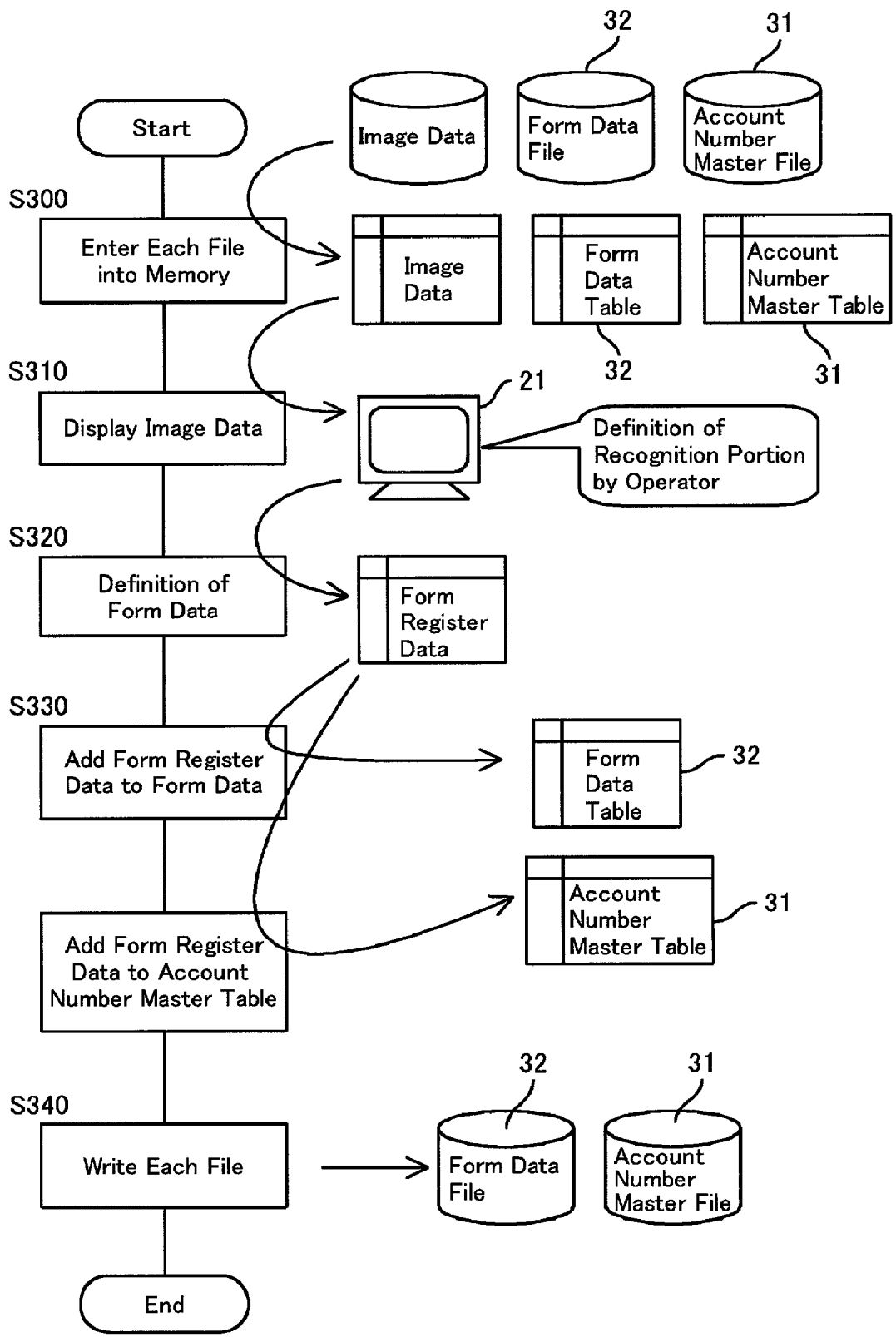
FIG. 10 is a flow chart of the form registration process in an embodiment of the present invention.

FIG. 10 is a flow chart of the file registration process in an embodiment of the present invention.

S300: The image data, form data file 32 and account number master file 31 of a file 22 are entered into a memory by operating a keyboard (not shown in the drawings) connected to the CPU 20.

S310: The entered image data are displayed on a display device 21.

S320: An operator observes the display, defines the recognition portions (positions, recognition categories, etc.), and produces form registration data.

S330: The form registration data are registered in the form data table 32. The account number is registered in the account master table 31.

S340: The tables 32 and 31 are written into the file 22.

In this manner, a new form is registered. In this example, the search rules for the account number of the new form are the same as those of a form that has already been registered, so that no new search rules are registered. However, it is possible to register other search rules, when a form with different search rules is registered.

OTHER EMBODIMENTS

In addition to the above-described embodiments, the following variations of the present invention are also possible.
(1) In the foregoing, the account number was shown to be a 5 digits-1 digit-6 digits numerical character string, but it can also be another numerical character string. Moreover, it can also be a numerical character string without hyphens.
(2) The foregoing explanations related to a sheet feed-type, but the present invention can also be applied to an apparatus and method where the sheets are fixed.

Thus, the present invention attains the following effects.

The present invention takes advantage of the fact that the payment form contains the payee account number, and that the form type is specified by this account number, so that the form is identified by recognizing the payee account number from the form image. Moreover, the account number is a character string of numerals and symbols, so that the account number can be identified on the form image with high precision by simple search rules (knowledge information). Therefore, the form can be identified accurately and fast. Furthermore, the payee account number is a portion of the input data of the payee form, so that form identification and data input can be performed simultaneously.

The invention has been described based on the embodiments. The invention, however, may be embodied in other specific forms without departing from the spirit or essential characteristics thereof, and these are not excluded from the scope of the invention.

What is claimed is:

1. A payment form discrimination method for discriminating a payment form which states at least a payee account number and a payment amount, comprising:
    acquiring image data of the form by optically reading the form;
    searching by a computer for the payee account number in the image data at an unknown position in accordance with an account number searching rule;
    determining by the computer a type of the form based on the payee account number from a document information table that stores account numbers correlated with types of the form; and
    recovering by the computer other data from locations according to the determined type of the form,
    wherein said account number searching rule comprises:
        searching for hyphens in the image data;
        determining at least one location of a specified hyphen arrangement formed by at least one group among the hyphens detected by said search;
        character-recognizing the image data in areas surrounding the at least one location of the specified hyphen arrangement; and
        determining an account number based on the character recognition and matching the account number with account numbers registered in said document information table, the matched account number being the payee account number.

2. The payment form discrimination method of claim 1, wherein the searching comprises:
    recognizing a plurality of account numbers on the payment form; and
    merging a plurality of results which have been recognized to determine the payee account number.

3. The payment form discrimination method according to claim 2, wherein said searching further comprises:
    determining said recognized account number as a merging result from a reject number of plural said character recognition result and a number of recognition character as same character in a same column.

4. The payment form discrimination method of claim 1, wherein the process unit recognizes a plurality of account numbers on the payment form, and merges a plurality of results which have been recognized to determine the payee account number.

5. The payment form discrimination method according to claim 1, wherein said searching comprises:
    recognizing hyphens defined by said account number recognition category in said searching table from said image;
    determining whether said recognized hyphens are characterizing hyphens according to an account number construction rule registered in said searching table; and
    character-recognizing an image on areas surrounding to said characterizing hyphens by a numeric and a hyphen that are an account number recognition category in said searching table.

6. A payment form discrimination apparatus for recognizing a form which states a payee account number and a payment amount, comprising:
    an image reader acquiring an image data of the form by optically reading the form;
    a processing unit, which performs searching for the payee account number in the image data at an unknown position in accordance with an account number searching rule, discriminates a type of form corresponding to said payee account number from a document information table that stores account numbers correlated with types of the form, and recovers other data from locations according to the determined type of the form;
    wherein said processing unit searches for hyphens in the image data, determines at least one location of a specified hyphen arrangement formed by at least one group among the hyphens, character-recognizes the image data in areas surrounding the at least one location of the specified hyphen arrangement, determines the account number based on the character recognition and matches the account number with account numbers registered in said document information table, the matched account number being the payee account number.

7. The payment form discrimination apparatus according to claim 6, wherein said processing unit recognizes hyphens defined by said account number recognition category in said searching table from said image, judges whether said recognized hyphens are characterizing hyphens according to an account number construction rule registered in said searching table, and character-recognizes an image on areas surrounding to said characterizing hyphens by a numeric and a hyphen that are an account number recognition category in said searching table.

8. The payment form discrimination apparatus according to claim 6, wherein said processing unit determines said recognized account number as a merging result from a reject number of plural said character recognition result and a number of recognition character as same character in a same column.

9. A method of determining a payment form type, comprising:

optically capturing image data of a payment form of an unknown type;

searching and determining, by a computer, an account number in an unknown position of the payment form of the unknown type in the image data, by searching for hyphens in the image data, and recognizing said payee account number at areas surrounding hyphens detected in the image data;

determining the payment form type using the account number, by the computer; and recovering data from locations according to the determined payment form type, by the computer, wherein said searching and determining of the account number comprises:

determining at least one location of a specified hyphen arrangement formed by at least one group among the hyphens detected by said search;

character-recognizing the image data in areas surrounding the at least one location of the specified hyphen arrangement; and determining the account number based on the character recognition and matching the account number with account numbers registered in a document information table in correlation with a payment form type, the matched account number being the payee account number.

* * * * *